(12) United States Patent
Strikovski

(10) Patent No.: US 9,912,139 B2
(45) Date of Patent: Mar. 6, 2018

(54) ELECTRICAL PENETRATOR ASSEMBLY

(71) Applicant: FMC Technologies, Inc., Houston, TX (US)

(72) Inventor: Andrei M. Strikovski, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 15/123,627

(22) PCT Filed: Mar. 3, 2014

(86) PCT No.: PCT/US2014/019981
§ 371 (c)(1),
(2) Date: Sep. 2, 2016

(87) PCT Pub. No.: WO2015/133992
PCT Pub. Date: Sep. 11, 2015

(65) Prior Publication Data
US 2017/0085074 A1    Mar. 23, 2017

(51) Int. Cl.
*H01R 13/40*    (2006.01)
*H02G 15/013*   (2006.01)
(Continued)

(52) U.S. Cl.
CPC ......... *H02G 15/013* (2013.01); *H01R 13/523* (2013.01); *H02G 3/22* (2013.01); *H02G 15/14* (2013.01)

(58) Field of Classification Search
CPC ...... H01R 13/523; H02G 3/22; H02G 15/013; H02G 15/14
(Continued)

(56) References Cited

U.S. PATENT DOCUMENTS 3,750,088 A * 7/1973 Berian ................. H01R 13/523
                                                        174/12 R
4,103,104 A * 7/1978 Spollen ................. H02G 15/14
                                                        174/70 S
(Continued)

FOREIGN PATENT DOCUMENTS

DE        2 201 348         7/1973
WO   WO 2012/038102 A1      3/2012

*Primary Examiner* — Abdullah Riyami
*Assistant Examiner* — Vladimir Imas

(57) ABSTRACT

A method of manufacturing an electrical penetrator assembly (1) comprising a penetrator housing (3) having a through-bore and an internal support surface; a ceramic sleeve assembly (2) sealingly providing a feed-through for an electrical conductor (29), which sleeve assembly comprises first and second outer support surfaces; and a compression member (6) comprising a compression surface; said method comprising the steps of sealingly attaching at least one metal, annular sealing member (4, 5) to a section of the sleeve assembly; positioning the sleeve assembly in the through-bore of the penetrator housing such that the first, outer support surface is brought into contact with the internal support surface; attaching the compression member to the penetrator housing such that the compression surface is brought into contact with the second, outer support surface; by means of the compression member, directly or indirectly preloading the sleeve assembly by applying a force onto the sleeve assembly such that a predetermined contact pressure is obtained between the first, outer support surface and the internal support surface; and directly or indirectly, sealingly connecting the at least one sealing member to the penetrator housing. The invention also relates to an electrical penetrator assembly manufactured according to the method.

15 Claims, 3 Drawing Sheets

(51) Int. Cl.
*H02G 3/22* (2006.01)
*H01R 13/523* (2006.01)
*H02G 15/14* (2006.01)

(58) Field of Classification Search
USPC .......................................... 439/598, 271, 199
See application file for complete search history.

(56) References Cited

U.S. PATENT DOCUMENTS

| | | | | |
|---|---|---|---|---|
| 4,172,212 A * | 10/1979 | Heinzer | ............... | G02B 6/4446 174/50 |
| 4,334,729 A * | 6/1982 | Allen | .................... | G21C 17/116 174/151 |
| 4,583,804 A * | 4/1986 | Thompson | ........... | H01R 13/533 439/470 |
| 4,614,392 A * | 9/1986 | Moore | ............... | H01R 13/5213 174/91 |
| 4,854,886 A * | 8/1989 | Neuroth | ................ | E21B 17/028 439/191 |
| 5,478,970 A * | 12/1995 | Lawler | .................. | E21B 17/023 174/74 R |
| 5,772,457 A * | 6/1998 | Cairns | ................. | H01R 13/523 439/201 |
| 6,067,395 A * | 5/2000 | Cairns | .................... | H02G 15/14 385/136 |
| 6,364,677 B1 * | 4/2002 | Nysveen | ................. | H02G 15/14 439/199 |
| 7,526,175 B2 * | 4/2009 | Sumitani | ................. | G02B 6/4428 174/70 S |
| 7,718,899 B2 * | 5/2010 | Benestad | ................ | H01B 17/30 174/152 R |
| 7,959,454 B2 * | 6/2011 | Ramasubramanian | | H01R 13/03 439/201 |
| 8,287,295 B2 * | 10/2012 | Sivik | ........................ | H02G 3/22 439/271 |
| 8,303,312 B2 * | 11/2012 | Raad | ..................... | H01R 13/523 439/8 |
| 8,708,727 B2 * | 4/2014 | Spahi | ........................ | H01R 13/523 174/152 GM |
| 8,747,134 B2 * | 6/2014 | Schlogl | ...................... | H01R 13/005 439/194 |
| 8,968,018 B2 * | 3/2015 | Sivik | ........................ | H02G 3/22 439/271 |
| 8,968,037 B2 * | 3/2015 | Boe | ..................... | E21B 33/0385 439/750 |
| 9,388,654 B2 * | 7/2016 | Urrego Lopera | ... | E21B 33/0385 |
| 2006/0009073 A1 * | 1/2006 | Holliday | ............... | H01R 9/0518 439/578 |
| 2008/0314616 A1 * | 12/2008 | Benestad | ................ | H01B 17/30 174/152 R |
| 2012/0217057 A1 | 8/2012 | Rousseau et al. | | |
| 2013/0065429 A1 | 3/2013 | Spahi et al. | | |
| 2013/0183853 A1 * | 7/2013 | Sivik | .................... | H01R 13/523 439/519 |

\* cited by examiner

ELECTRICAL PENETRATOR ASSEMBLY

FIELD OF THE INVENTION

The present invention generally relates to an electrical penetrator assembly for feed-through of electrical power through a wall of a pressurized vessel or the like, and is particularly concerned with an electrical penetrator assembly for subsea use.

In particular, the present invention relates to an electrical penetrator assembly comprising:

a penetrator housing comprising a through-bore and an internal support surface;

a compression member which is attached to the penetrator housing and comprises a compression surface; and a ceramic sleeve assembly sealingly providing a feed-through for an electrical conductor, which sleeve assembly is positioned in the through-bore of the penetrator housing and comprises a first, outer support surface interacting with the internal support surface, and a second, outer support surface interacting with the compression surface.

The present invention also relates to a method of manufacturing such an electrical penetrator assembly.

BACKGROUND OF THE INVENTION

Electrical penetrators are used to power subsea electric submersible pump (ESP) equipment, compressor stations and the like which pressurize hydrocarbons in oil well installations at seabed, and also in other applications, such as high pressure downhole electrical penetrations and other penetrations, to provide power to various types of subsea equipment, such as separation equipment, metering equipment and/or monitoring and safety equipment. The penetrator extends through the wall or bulkhead of the vessel in which the equipment is located, and is normally connected to power cables at one end for connecting the equipment to an external power source. Penetrators may be connect an electric line into an environment with well pressure or pressurized fluid or from an environment at large water depths. This creates an extreme environment for the connection or penetrator in terms of pressure, temperature, and high voltage. The penetrator must transfer power through the barrier as well as maintain a pressure barrier for both internal pressure and external pressure caused by for instance the depth in seawater.

Consequently, an electrical penetrator assembly should be capable of operating at high differential pressures and at elevated temperatures.

In a typical electrical penetrator, a one-piece or multi-piece electrical conductor extends through a bore in an insulating sleeve or body. The insulating sleeve, in turn, extends through a penetrator body or housing which is connected to the vessel through which the penetrator extends.

In high temperature and high pressure applications, the insulating sleeve is usually made of a ceramic material.

The sealing between the electrical conductor and the ceramic insulator, and between the ceramic insulator and the penetrator housing or body, should be designed to withstand loads associated with manufacturing, testing, storage, transportation and, ultimately, operation at elevated temperatures and high pressures.

Normally, the penetrator body is made from a corrosion resistant metal in order to be connected to a metal wall or a bulkhead of the equipment to be provided with the penetrator. This produces the problem of providing a robust and reliable seal between the metal penetrator housing and the ceramic insulating sleeve.

U.S. Pat. No. 8,287,295 discloses a brazing and welding technique for creating a seal between the electrical conductor and the ceramic insulator. However, the same technique is not suitable for creating a seal between the ceramic insulator and the penetrator housing. Creating such a seal is challenging. Elastomer or thermoplastic seals may not be an acceptable option for specific application and metal seals are difficult to implement for this application. Therefore, an alternative, reliable solution is needed.

According to one aspect of the present invention, an object of the invention is to provide a method of manufacturing a robust and reliable electrical penetrator assembly which is capable of withstanding high differential pressure and a wide range between minimum and maximum temperature.

According to another aspect of the present invention, an object of the invention is to provide an electrical penetrator assembly which comprises a robust and reliable seal between a sleeve assembly and the penetrator housing.

A further object is to provide an electrical penetrator assembly which is capable of withstanding high differential pressure and a wide range between minimum and maximum temperatures.

Yet a further object is to provide an electrical penetrator assembly which allows for a design which minimizes the space required to implement the seal between the sleeve assembly and the penetrator housing.

SUMMARY OF THE INVENTION

The method according to the invention is characterised by the steps of:

sealingly attaching at least one metal, annular sealing member to a section of the sleeve assembly;

positioning the sleeve assembly in the through-bore of the penetrator housing such that the first, outer support surface is brought into contact with the internal support surface;

attaching the compression member to the penetrator housing such that the compression surface is brought into contact with the second, outer support surface;

by means of the compression member, directly or indirectly preloading the sleeve assembly by applying a force onto the sleeve assembly such that a predetermined contact pressure is obtained between the first, outer support surface and the internal support surface; and directly or indirectly, sealingly connecting the at least one sealing member to the penetrator housing.

The electrical penetrator assembly according to the invention is characterised in that the assembly comprises:

at least one metal, annular sealing member which is sealingly attached to a section of the sleeve assembly;

wherein the compression member is configured to apply a preloading force onto the sleeve assembly such that a predetermined contact pressure is obtained between the first, outer support surface and the internal support surface, and wherein the at least one sealing member is directly or indirectly sealingly connected to the penetrator housing.

According to the invention, a metal, annular sealing member, e.g., a metal membrane, is used as a sealing element between the ceramic sleeve assembly, i.e., the insulator, and the penetrator housing. This configuration allows the sealing member to be brazed to the sleeve assembly, which creates a strong, sealing bond between the sealing member and the sleeve assembly.

According to the invention, the sealing members only act as a seal and do not provide any substantial structural support for the ceramic sleeve assembly when the penetrator assembly is subjected to differential pressure during operation.

During the manufacturing of the penetrator assembly, the sleeve assembly is preloaded by means of the compression member, whereafter the sealing members are sealingly connected, directly or indirectly, to the penetrator housing. The preloading reduces or eliminates stress on the sealing members due to differential pressure-induced movement of the ceramic sleeve assembly during operation.

The configuration according to the invention allows a small diameter of the sealing members which, in turn, reduces the force transferred to the ceramic sleeve assembly during operation. This, in turn, allows for a compact design of the penetrator assembly since load-carrying shoulders or surfaces of the ceramic sleeve assembly can be reduced as compared to prior art designs.

In addition, the configuration according to the invention allows for a low profile of the compression member, where the outer diameter of the compression member may be almost equal to the maximum outer diameter of the ceramic sleeve assembly.

During said step of sealingly attaching the at least one sealing member to the sleeve assembly, it may be advantageous to braze the at least one sealing member to a mantle surface of the sleeve assembly.

During said step of sealingly attaching the at least one sealing member to a section of the sleeve assembly, it may be advantageous to:

sealingly attach a first metal, annular sealing member to a first section of the sleeve assembly; and sealingly attach a second metal, annular sealing member to a second section of the sleeve assembly.

During said step of sealingly attaching the first sealing member to the first section of the sleeve assembly, it may be advantageous to braze the first sealing member to a first mantle surface of the first section, and during said step of sealingly attaching the second sealing member to the second section of the sleeve assembly, it may be advantageous to braze the second sealing member to a second mantle surface of the second section.

During said step of sealingly connecting the at least one sealing member to the penetrator housing, it may be advantageous to attach the at least one sealing member directly to the penetrator housing.

During said step of sealingly attaching the at least one sealing member directly to the penetrator housing, it may be advantageous to create a first seal by welding the at least one sealing member to the penetrator housing.

During said step of sealingly connecting the at least one sealing member to the penetrator housing, it may be advantageous to indirectly connect the at least one sealing member to the penetrator housing via the compression member.

During said step of sealingly connecting the at least one sealing member indirectly to the penetrator housing, it may be advantageous to create a second seal by welding the at least one sealing member to the compression member, and to create a third seal by welding the compression member to the penetrator housing.

During said step of sealingly connecting the at least one sealing member to the penetrator housing, it may be advantageous to:

at a first end surface of the penetrator housing, attach a first sealing member directly to the penetrator housing, and create a first seal by welding the first sealing member to the penetrator housing; and at a second end surface of the penetrator housing, connect a second sealing member to the penetrator housing via the compression member, create a second seal by welding the second sealing member directly to the penetrator housing, and create a third seal by welding the compression member to the penetrator housing.

During said step of preloading the sleeve assembly, it may be advantageous to create a contact stress upon the sleeve assembly which is equal to the contact stress expected to arise during operation of the penetrator assembly.

It may be advantageous to arrange the compression member to comprise an annular bolt which is threaded into the penetrator housing and to preload the sleeve assembly by applying a torque onto the annular bolt.

The sleeve assembly may advantageously comprise a central section positioned between said first and second sections, which central section comprises said first and second outer support surfaces, and a third, central mantle surface displaying a diameter which is larger than the diameters of said first and second mantle surfaces.

Said first and second support surfaces may advantageously be cone-shaped and face away from each other.

The penetrator assembly may advantageously comprise a spacer which is positioned between said at least one sealing member and a stop surface of the sleeve assembly.

BRIEF DESCRIPTION OF THE DRAWINGS

In the following, the invention will be disclosed in more detail with reference to the appended drawings, in which.

DETAILED DESCRIPTION OF THE INVENTION

Figure 1:
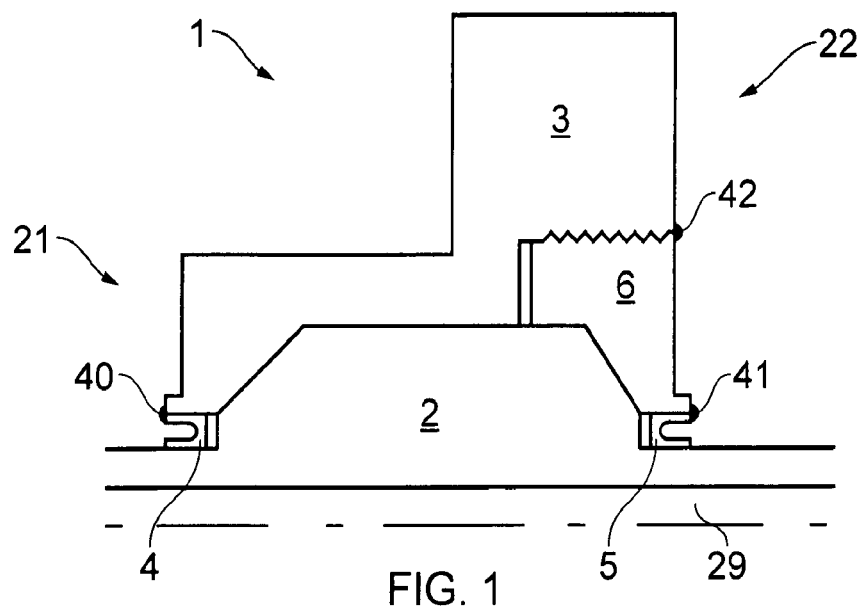
FIG. 1 is a schematic drawing of an electrical penetrator assembly according to a first embodiment of the invention.

FIG. 1 discloses an electrical penetrator assembly 1 according to a first embodiment of the invention. The penetrator assembly 1 comprises an elongated and generally rotational symmetric ceramic sleeve assembly 2 which provides a feed-trough for an electrical conductor 29 in a manner which is, as such, known in the art. The penetrator assembly 1 further comprises a metal penetrator housing 3 in which the sleeve assembly 2 is sealingly arranged. The penetrator assembly 1 also comprises first and second metal, annular sealing members 4, 5, e.g., in the form of metal membranes, which are sealingly attached to the surface of the sleeve assembly 2. The penetrator assembly 1 also comprises an annular compression member 6 which is attached to the penetrator housing 3 and imparts a pre-determined compressive force upon the sleeve assembly 2. In the disclosed embodiment, the compression member 6 comprises a metal annular bolt or nut having external threads which form a threaded joint with corresponding internal threads of the penetrator housing 2.

A pre-determined, preloading compressive force is imparted upon the sleeve assembly 2 by the penetrator housing 3 and the compression member 6.

The first sealing member 4 is sealingly connected to the penetrator housing 3 by means of a first seal 40, and the second sealing member 5 is sealingly connected to the compression member 6 by means of a second seal 41. The compression member 6, in turn, is sealingly connected to the penetrator housing 3 by means of a third seal 42. The seals 40 and 41 may comprise an annular weld joint, e.g., produced using a suitable electron beam welding technique. It may be advantageous to effectuate also the seal 42 in the same way.

The first seal 40 is located at a first end surface 21 of the penetrator housing 3, and the second and third seals 41, 42 are located at a second, opposite end surface 22 of the penetrator housing 3, thus allowing the positioning of the first seal 40 and the second and third seals 41, 42 on opposite sides of a wall or bulkhead.

In the following, the particulars of the penetrator assembly 1 will be discussed in more detail with reference to FIGS. 2-6. Also, an embodiment of a method of manufacturing the penetrator assembly 1 will be discussed.

Figure 2:
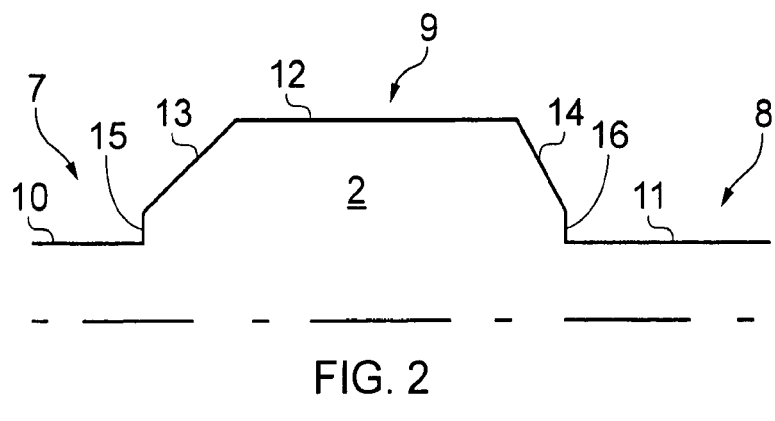
FIG. 2 is a schematic drawing of a ceramic sleeve assembly according to FIG. 1.
Figure 3:
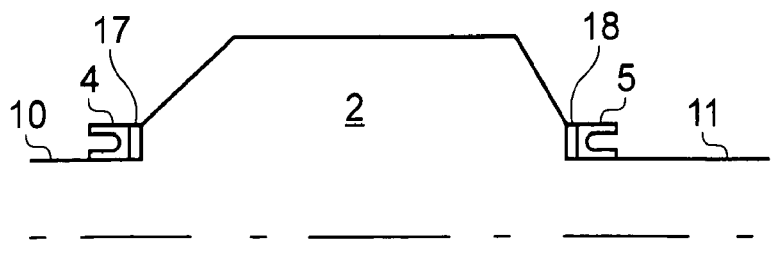
FIG. 3 is a schematic drawing of the ceramic sleeve assembly according to FIG. 1 having sealing members sealingly attached to its mantle surfaces.

FIG. 2 discloses the ceramic sleeve assembly 2 of FIG. 1. As discussed above, the sleeve assembly 2 provides a feed-trough for an electrical conductor (not disclosed) in a manner which is, as such, known in the art. For example U.S. Pat. No. 8,287,295 discloses such a ceramic sleeve assembly. The sleeve assembly 2 is sealed to the electrical conductor using a suitable prior art technique, e.g. the technique disclosed in U.S. Pat. No. 8,287,295.

The sleeve assembly 2 comprises a first cylindrical section 7, a second cylindrical section 8 and a third, central cylindrical section 9 positioned between sections 7 and 8. Each section 7-9 displays a generally cylindrical outer, or mantle, surface 10, 11, 12. However, the outer diameter of the central section 9 is lager than the diameter of the neighboring sections 7 and 8 such that the central mantle surface 12 displays a diameter which is larger than the diameters of the neighbouring mantle surfaces 10 and 11. The central section 9 further displays first and second cone-shaped outer support surfaces 13, 14, which face away from each other, and first and second stop surfaces 15, 16, which connect the central mantel surface 12 to the neighbouring mantle surfaces 10 and 11 such that the stop surfaces 15, 16 form transition surfaces between the mantle surface 10 and the support surface 13 and between the mantle surface 11 and the support surface 14, respectively. The stop surfaces 15, 16 are generally orthogonal to the longitudinal axis of the sleeve assembly 2.

The method of manufacturing the electrical penetrator assembly 1 comprises sealingly attaching the first and second sealing members 4, 5 to the outer surface of the sleeve assembly 2, i.e., on the first and second mantle surface 10, 11, respectively. Consequently, sealing members 4, 5 are attached to the sleeve assembly 2 on either side of the central section 9, as is disclosed in FIG. 3, such that the interface between each sealing member 4, 5 and the sleeve assembly 2 is formed by a cylindrical surface. This enables the formation of a strong, sealing bond between the sealing members 4, 5 and the sleeve assembly 2.

Preferably, the metal sealing members 4, 5 are brazed to the surface of the ceramic sleeve assembly 2.

Spacers 17, 18 may be arranged between the stop surfaces 15, 16 and the sealing members 4, 5 in order to position the sealing members 4, 5 longitudinally on the sleeve assembly 2 (c.f. FIG. 2). The spacers 15, 16 can also be used to prevent the sealing members 4, 5 from attaching to the stop surfaces 15, 16 during the step of sealingly attaching the sealing members 4, 5 to the sleeve assembly 2. Alternatively, the sealing members 4, 5 are not supported in the longitudinal direction of the sleeve assembly 2, in which case the sealing members 4, 5 are positioned such that they do not interact with spacers or the stop surfaces 15, 16.

Figure 4:
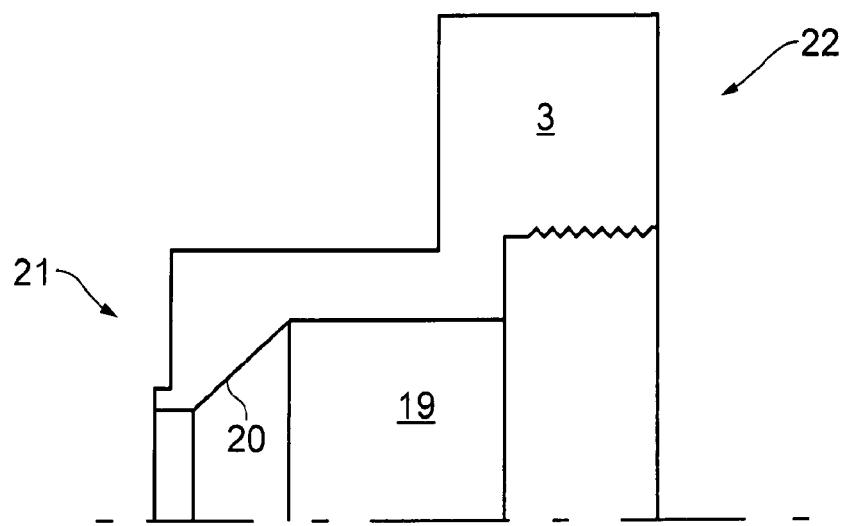
FIG. 4 is a schematic drawing of a penetrator housing according to FIG. 1.

After the step of sealingly attaching the sealing members 4, 5 to the sleeve assembly 2, the sleeve and sealing member sub-assembly is inserted into a through-bore 19 of the penetrator housing 3 such that the first support surface 13 of the sleeve assembly 2 is brought into contact with a corresponding internal, cone-shaped support surface 20 of the penetrator housing 3 (cf. FIG. 4), and such that the first and second sealing members 4, 5 are generally aligned with first and second end surfaces 21, 22, respectively, of the penetrator housing 3 (c.f. FIG. 4).

Figure 5:
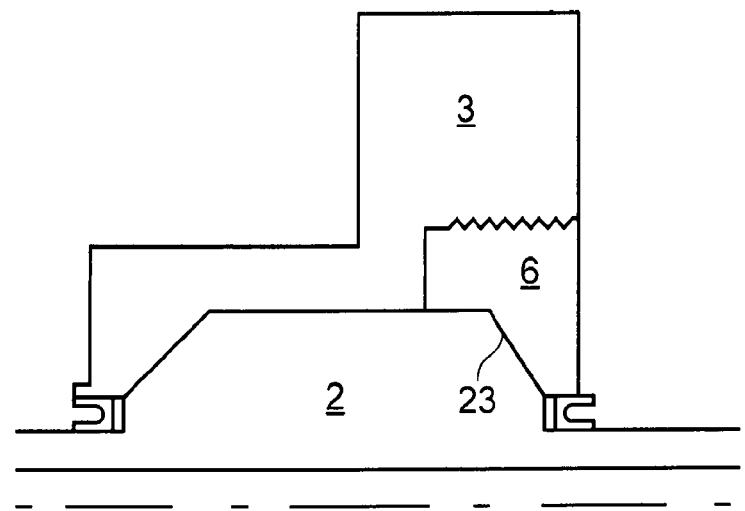
FIG. 5 is a schematic drawing of a penetrator housing according to FIG. 1 and the ceramic sleeve assembly inserted into a through-bore of the penetrator housing.
Figure 6:
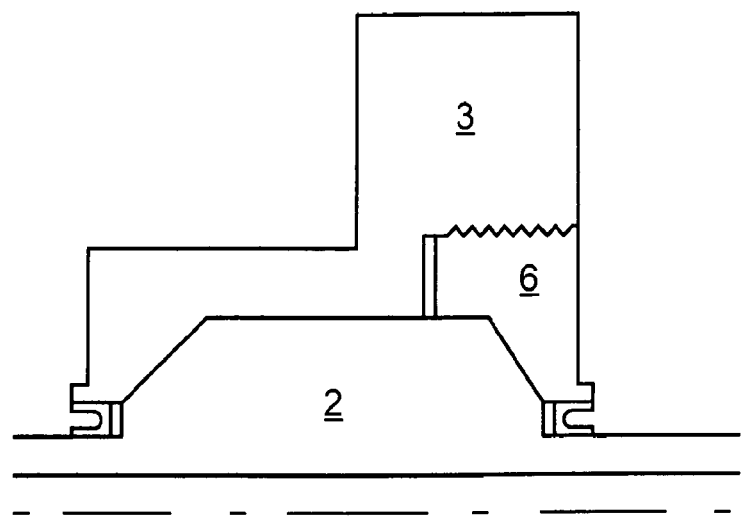
FIG. 6 is a schematic drawing of a compression member applying a pressure onto the ceramic sleeve assembly according to FIG. 1.

Next, the compression member 6 is attached to the penetrator housing 3 such that a compression surface 23 of the compression member 6 is brought to interact with the second support surface 14 of the sleeve assembly 2 and such that the first support surface 13 of the compression member 6 is brought to interact with the internal support surface 20 of the penetrator housing 3 (cf. FIGS. 2 and 5). In the present embodiment, the compression member 6 comprises an annular bolt or nut which is threaded into the penetrator housing 3. This will allow a controlled tightening of the compression member 6 by the application of a torque onto the annular bolt such that a pre-determined, preloading compressive stress is imparted upon the sleeve assembly 2 by the penetrator housing 3 and the compression member 6.

The compression member 6 may be split in two components (not disclosed) to prevent rotation between the compression surface 23 and the second support surface 14 during preloading of the sleeve assembly 2. The angle between the two components should be higher than angle of the second support surface 14 (from horizontal) to ensure that relative rotation occurs between the two components and not between the surfaces 14 and 23 (assuming similar coefficients of friction between ceramic/metal and metal/metal).

The preloading stress will eliminate relative movement between the ceramic sleeve assembly 2 and the compression member 6 and penetrator housing 3 when a differential pressure is applied over the penetrator assembly 1 during operation. This, in turn, will reduce the stress brought upon the interface between the sealing members 4, 5 and the sleeve assembly 2 during operation.

When the sleeve assembly 2 has been preloaded to the desired, pre-determined compressive stress, the seals 40 and 41 are applied such that the first sealing member 4 is sealingly attached to the penetrator housing 3, and such the second sealing member 5 is sealingly attached to the compression member 6 (cf. FIG. 1). Also, the seal 42 is applied such that the compression member 6 is sealingly attached to the penetrator housing 3. As discussed above, each seal 40, 41, 42 may advantageously comprise an annular weld joint, e.g., produced using a suitable electron beam welding technique.

Consequently, the ceramic sleeve assembly 2 is preloaded before the seals 40 and 41 are applied. This will reduce the load on the seals 40, 41 when pressure is applied to penetrator assembly 1 during operation. Also, the design according to the invention allows locating the sealing members 4, 5 on the smaller diameter of the ceramic sleeve assembly 2, i.e., on sections 7 and 8 (cf. FIG. 2). This significantly reduces the load on the ceramic sleeve assembly 2 and the stop surfaces 15, 16 when pressure is applied to the penetrator assembly 1 during operation.

It is to be understood that the amount of preloading should advantageously be adapted to the intended operation pressure range of the penetrator assembly. In general, the preloading should advantageously create a contact stress between surfaces 13 and 20, and between surfaces 14 and 23, equal to the contact stress expected during operation. This is, however, not always achievable, but even a relatively small preloading stress will reduce the stress on the penetrator assembly during operation. In practice, preloading entails maximising the preloading stress within the design limitations of penetrator assembly. However, there is generally no reason to allow the preloading to exceed stresses expected to be encountered during operation.

Figure 7:
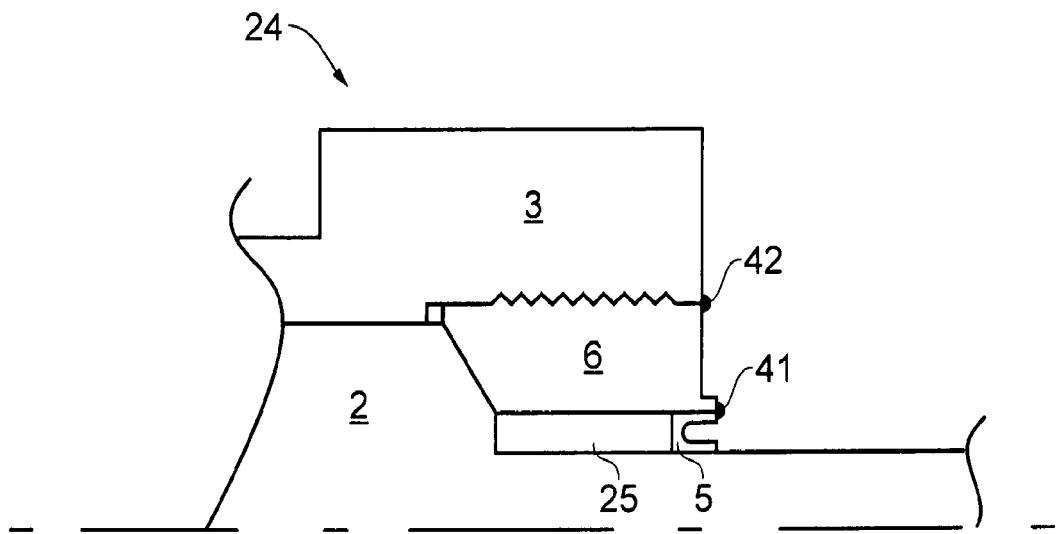
FIG. 7 is a schematic drawing of an electrical penetrator assembly according to a second embodiment of the invention.

FIG. 7 discloses a second embodiment of a penetrator assembly 24 according to the invention. The penetrator assembly 24 is generally identical to the above-disclosed penetrator assembly 1. However, the penetrator assembly 24 comprises a spacer 25 which is wider than the previously disclosed spacer 18 and, consequently, more capable of resolving thermal expansion. FIG. 7 also illustrates how the width of the spacer can be adjusted to position a sealing member level with the compression member 6 and/or the penetrator housing 3.

Figure 8:
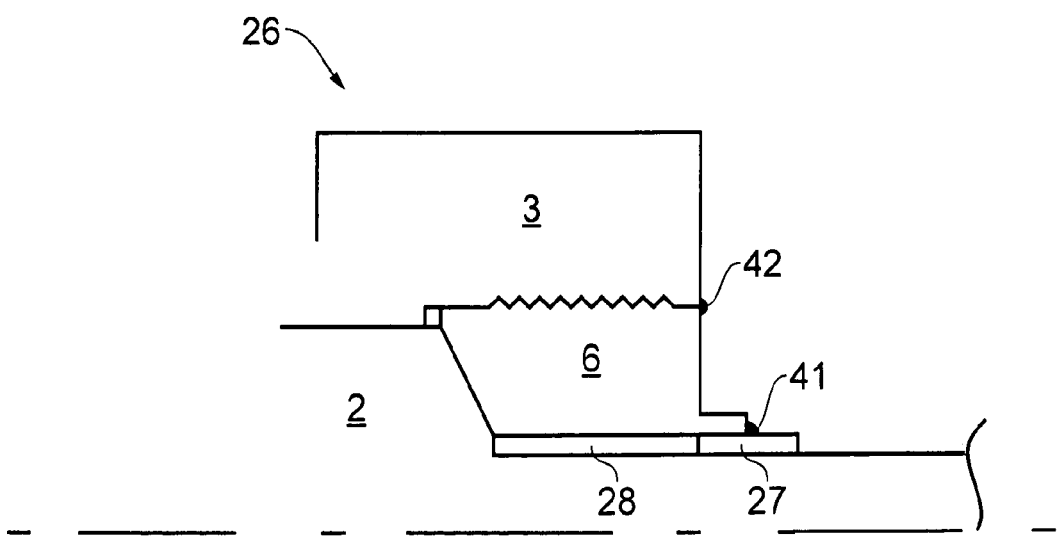
FIG. 8 is a schematic drawing of an electrical penetrator assembly according to a third embodiment of the invention.

FIG. 8 discloses yet another embodiment of a penetrator assembly 26 according to the invention, which embodiment comprises a sealing member 27 and a spacer 28 in the form of annular, low profile rings which provide for a compact design of the penetrator assembly 26.

The spacers 17, 18, 25, 28 may be made of a ceramic material and can be formed as an integral part of the sleeve assembly.

In the preceding description, various aspects of the invention have been described with reference to illustrative embodiments. However, this description is not intended to be construed in a limiting sense. Various modifications and variations of the illustrative embodiments, as well as other embodiments of the invention, which are apparent to persons skilled in the art to which the disclosed subject matter pertains, are deemed to lie within the scope of the present invention.

The invention claimed is:

1. A method of manufacturing an electrical penetrator assembly, the penetrator assembly comprising a penetrator housing having a through-bore and an internal support surface; a ceramic sleeve assembly providing a sealed feed-through for an electrical conductor, the sleeve assembly including a first section which comprises a first mantle surface, a second section which comprises a second mantle surface, and a central section positioned between the first section and the second section, the central section having a first outer support surface, a second outer support surface and a third central mantle surface which is positioned between the first and second outer support surfaces and comprises a diameter which is larger than the diameters of the first and second mantle surfaces; and a compression member comprising a compressions surface; said method comprising the steps of:

sealingly attaching a first metal, annular sealing member to the second section of the sleeve assembly;

positioning the sleeve assembly in the through-bore of the penetrator housing such that the first outer support surface is brought into contact with the internal support surface;

attaching the compression member to the penetrator housing such that the compression surface is brought into contact with the second outer support surface;

using the compression member, preloading the sleeve assembly by applying a force onto the sleeve assembly such that a predetermined contact pressure is obtained between the first outer support surface and the internal support surface; and sealingly connecting the first sealing member to the penetrator housing via the compression member after said step of preloading the sleeve assembly.

2. The method according to claim 1, wherein said step of sealingly attaching the first sealing member to the sleeve assembly comprises brazing the first sealing member to the second mantle surface.

3. The method according to claim 1, wherein said step of sealingly connecting the first sealing member to the penetrator housing via the compression member comprises creating a first seal between the first sealing member and the compression member by welding the first sealing member to the compression member, and creating a second seal between the compression member and the penetrator housing by welding the compression member to the penetrator housing.

4. The method according to claim 1, further comprising the steps of:

sealingly attaching a second metal, annular sealing member to the first section of the sleeve assembly; and sealingly connecting the second sealing member directly to the penetrator housing after said step of preloading the sleeve assembly.

5. The method according to claim 4, wherein said step of sealingly attaching the second sealing member to the first section of the sleeve assembly comprises brazing the second sealing member to the first mantle surface.

6. The method according to claim 4, wherein said step of sealingly connecting the second sealing member directly to the penetrator housing comprises creating a third seal between the second sealing member and the penetrator housing by welding the second sealing member to the penetrator housing.

7. The method according to claim 1, wherein said step of preloading the sleeve assembly comprises creating a contact stress upon the sleeve assembly which is equal to a contact stress expected to arise during operation of the penetrator assembly.

8. The method according to claim 1, wherein said compression member comprises an annular bolt which is threaded into the penetrator housing, and wherein said step of preloading the sleeve assembly comprises applying a torque onto the annular bolt.

9. An electrical penetrator assembly comprising:

a penetrator housing which comprises a through-bore and an internal support surface;

a compression member which is attached to the penetrator housing and comprises a compression surface;

a ceramic sleeve assembly which provides a feed-through for an electrical conductor, the sleeve assembly being positioned in the through-bore and including a first section which comprises a first mantle surface, a second section which comprises a second mantle surface, and a central section positioned between the first section and the second section, the central section including a first outer support surface which interacts with the internal support surface, a second outer support surface which interacts with the compression surface, and a third central mantle surface which is positioned between the outer support surfaces and comprises a diameter which is larger than the diameters of the first and second mantle surfaces; and a first annular sealing member which is sealingly attached to the second section of the sleeve assembly;

wherein the compression member is configured to apply a preloading force onto the sleeve assembly such that a predetermined contact pressure is obtained between the first outer support surface and the internal support surface; and wherein the first sealing member is sealingly connected to the penetrator housing via the compression member.

10. The penetrator assembly according to claim 9, wherein said first sealing member is brazed to the second mantle surface.

11. The penetrator assembly according to claim 9, wherein said first sealing member is sealingly attached to the compression member by a first weld seal and the compression member is sealingly attached to the penetrator housing by a second weld seal.

12. The penetrator assembly according to claim 9, further comprising:

a second annular sealing member which is sealingly attached to the first section of the sleeve assembly;

wherein the second sealing member is sealingly connected directly to the penetrator housing.

13. The penetrator assembly according to claim 12, wherein said second sealing member is brazed to the first mantle surface.

14. The penetrator assembly according to claim 12, wherein said second sealing member is sealingly attached directly to the penetrator housing by a third weld seal.

15. The penetrator assembly according to claim 9, further comprising a spacer positioned between said first sealing member and a stop surface of the sleeve assembly.

* * * * *